J. J. HOMANS.
APPARATUS FOR SEPARATING SCUM AND PRECIPITATES FROM SUGAR JUICE.
APPLICATION FILED OCT. 12, 1909.

978,450.

Patented Dec. 13, 1910.

WITNESSES:
David J. Walsh

INVENTOR,
JACOBUS JOHANNES HOMANS,
BY
ATTORNEY

UNITED STATES PATENT OFFICE.

JACOBUS J. HOMANS, OF SAMARANG, JAVA.

APPARATUS FOR SEPARATING SCUM AND PRECIPITATES FROM SUGAR-JUICE.

978,450.  Specification of Letters Patent.  Patented Dec. 13, 1910.

Application filed October 12, 1909. Serial No. 522,319.

*To all whom it may concern:*

Be it known that I, JACOBUS JOHANNES HOMANS, a subject of the Queen of the Netherlands, and residing at Samarang, in the county of Samarang, Isle of Java, have invented a new and useful Apparatus for Separating Scum and Precipitates from Sugar-Juice; and I do hereby declare the following to be a full, clear, and exact description of the same.

The present invention relates to apparatus for effecting clarification of sugar-juice. By "sugar-juice", I means (1) the raw juice or sap of sugar-producing plants, roots or trees, and (2) in the manufacture and refining of sugar, a more or less concentrated solution of sugar.

The new improvements relate to an apparatus wherein sugar-juice is subjected to centrifugal action, and is, preferably, for the practice of the process described in my companion application, Serial No. 529,949, filed November 23, 1909, for Letters Patent of the United States, maintained during the separation at a temperature not lower than that of the "cracking point" (about 94° C. or 95° C.) in the defecation process. In my aforesaid companion application (which is filed as a division of this present application), I have emphasized the speed, economy and completeness of the clarification of sugar-juice when my said process is availed of.

Figure 1:
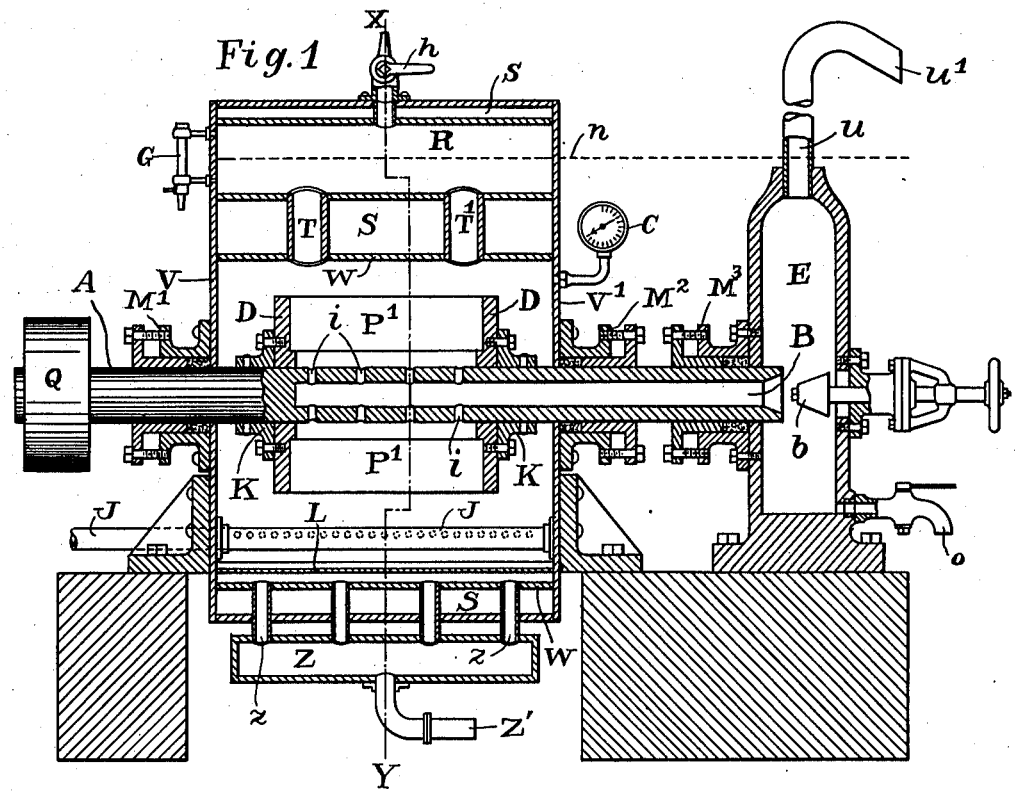
Figure 2:
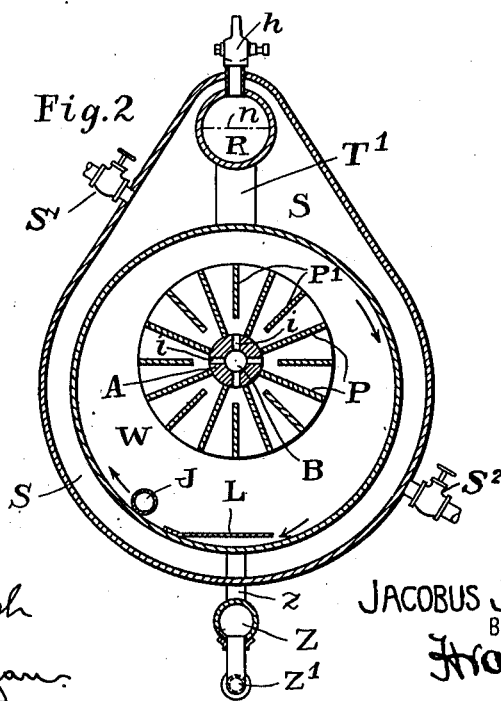

Referring to the accompanying drawings: Figure 1 is a longitudinal sectional view through such an apparatus, and Fig. 2 illustrates a vertical section thereof, on the line X—Y of Fig. 1.

The illustrated form of apparatus comprises a vessel W, a steam-chamber (S, S) around said vessel, a perforated pipe J for supplying juice thereinto, a plate, L, for directing separated scum to a discharge passage, and a rotatable shaft, A—B, made hollow for leading off clarified juice, and a succession of paddles, P and P$^1$, constituting a centrifugal device, rotatable with the shaft. The vessel W is stationary and is preferably cylindrical in shape, with end walls V and V$^1$. It is provided with a supplementary chamber R, connected therewith by pipes T and T$^1$. The vessel has a plate L, free along one edge, and from the lower part of the passage thus formed, there lead several pipes z, connecting with a collecting chamber Z, and a draw-off pipe z$^1$, the latter controlled by any suitable valve and leading to any suitable apparatus, for instance, a pump having one-eighth the capacity of the juice-pump. A metallic or other casing incloses or surrounds the vessel W, the supplementary chamber R, the scum passage and portions of the outlet pipes z. Steam is supplied in any usual manner into the chamber, S, thus formed, and the desired object— maintaining the fluid above 95° C. during the separating treatment—is thus attained, by heating the exterior of the vessel W and chamber R. Suitable inlet and outlet ports, S$^1$ and S$^2$, may be provided for the inlet of steam and egress of water. A supply pipe J is let into the vessel W, and is therein provided with a number of perforations for directing sugar-juice in the direction of the rotation of the paddles. Said pipe is preferably disposed near the wall of chamber W, slightly in advance in the direction indicated by the arrows of the closed edge of plate L. The chamber R is shown as provided with a gage-glass G, while the vessel W is provided with a thermometer, C, for indicating the temperature of the sugar-juice.

The device, within the vessel for subjecting the juice to centrifugal action, is shown as provided with a shaft A—B to rotate about a horizontal axis disposed eccentrically of the vessel, a little above the center of said vessel. At one end A (outside of the vessel) a driving pulley, Q, is secured upon the shaft. The other end (B) of the shaft is hollowed to a point well within the vessel, and a number of perforations (i) through said shaft, between the end-disks hereafter mentioned, connect the interior of the vessel and the hollow of the shaft. The shaft carries, within the vessel, end disks, D, D, secured in place by clamping-rings K, K, and the disks are utilized for holding in relation a succession of radially-disposed paddles P and P$^1$, the latter alternating with the former (as shown in Fig. 2) and being of lesser width, so as to leave an unobstructed passage thereunder for the juice to enter the perforations i. For good results, I prefer that the outer edges of the plates P and P$^1$ shall be coincident with the outer edges of the disks D, D. In number, the paddles P, P$^1$, may range from two to thirty two, according to the diameter of the disks D, and to the speed at which the shaft is to be driven.

The hollow end, B, of the shaft leads into a chamber E, which is provided, at its top, with an outlet pipe $u$, $u^1$, and with a draw-off tap $o$. At one side, and opposite the discharge opening of the hollow shaft, the chamber E carries a valve $b$, which may be advanced or retracted by a connected handle, to control or cut off the discharge of sugar-juice into the chamber. The shaft passes through stuffing boxes $M^1$, $M^2$, $M^3$, of any suitable construction.

In operation, when the apparatus is employed in the practice of the process set forth in my said divisional application, steam is turned into the chamber S and the vessel W is heated (say to 110° C.). The hollow axle has been closed by the valve $b$, and a cock $h$ has been opened to permit air to escape from the vessel W and supplemental chamber R. Sugar-juice, at a temperature of not less than 95° C., and preferably not higher than 115° C., is then supplied—preferably by pumping—through the perforated pipe J into the vessel W and rises into the supplemental chamber R until it reaches the level indicated at $n$; thereupon the supply is stopped and cock $h$ is closed. As a part of the scum from the defecation process contains air and other gases, it will be preferable to convey the juice, before centrifugal action, to a vessel which permits the gases to escape. The presence of the steam or gases in the scum tends to keep the latter lighter than other impurities. When the scum is freed from steam or gases, it has about the same specific gravity as said other impurities. The level indicated should be maintained, as nearly as possible, during the operations of the apparatus; and, in no case, should the level of the liquid be permitted to fall below the bottom of the pipes T and $T^1$. The shaft is then rotated until it reaches the desired speed, and, in a short time, the valve $b$ may be opened. Simultaneously with the opening of the valve, the juice-pump is put in action. Upon rotation of the shaft, in the direction indicated by the arrow, the paddles cause the scum (relieved of air and steam, and therefore heavier than juice as aforesaid) to be driven to the wall of the cylinder and to be carried in said direction, to the passage underneath the plate L, which directs said scum to the outlet pipes $z$. The remaining sugar-juice passes, by the openings $i$, into the hollow shaft.

That quantity of juice first discharged through the shaft may not be sufficiently clear. In such event, it may be drawn off by faucet $o$ and returned for clarification. Clarified sugar-juice may be drawn, through pipes $u$ and $u^1$, from the chamber E. I have secured good results, when the outlet $u^1$ is about eight meters above the usual level of juice in chamber R.

The operation may be continuous, sugar-juice being constantly supplied to the vessel W, and clarified juice being constantly discharged from shaft-end B into chamber E. When no further juice is to be supplied to the apparatus, the valve $b$ must close the discharge through the shaft. The same must be done, whenever the rotation of the shaft is to be stopped.

I have ascertained, by experience, that an apparatus of the character illustrated, and having disks three feet in diameter and blades three feet long, will, at 500 revolutions per minute, clarify juice from 800 tons of sugar-cane or sugarbeets, in twenty-four hours.

Apparatus constructed according to the lines herein described and illustrated, may be used to clarify juice (without regard to the temperature of the latter) of the carbonation process.

What I claim is:

1. In an apparatus useful in clarification of sugar-juice, a stationary vessel, means for heating the contents of said vessel while therein, a rotatable device within the vessel for subjecting said contents to centrifugal action, means for supplying sugar-juice into the vessel near the edge thereof and for directing the supplied juice in the same direction as that of rotation of said rotatable device, and a plate secured to the wall of the vessel closed along one edge and open along an edge to readily receive material driven thereto by said rotatable device.

2. In an apparatus useful in clarification of sugar-juice, a stationary vessel, means for heating the contents of said vessel while therein, means for supplying sugar-juice to the vessel, a rotatable device for subjecting its contents to centrifugal action, means for separating said juice from its precipitates, according to their specific gravities into two cylindric layers, the clear juice forming the medium layer, close to the axis of said rotatable device, the scum forming the peripheric layer, and means for leading off separated scum and means for separately leading off the clear juice.

3. In an apparatus useful in clarification of sugar-juice, a vessel, means for heating the contents of said vessel while therein, a rotatable device in the vessel for subjecting its contents to centrifugal action, a chamber for sugar-juice, means for leading off sugar-juice relieved of scum from said vessel to said chamber, and a valve for controlling such leading off of sugar-juice.

4. In an apparatus useful in clarification of sugar-juice, a vessel, means for supplying sugar-juice thereinto, means for heating sugar-juice while in said vessel, a rotatable device for subjecting the contents of the vessel to centrifugal action and having a hollow rotatable shaft which opens into the vessel for leading sugar-juice therefrom, a chamber for receiving sugar-juice delivered from the hollow shaft, and a valve for controlling the delivery of juice through the shaft.

5. In an apparatus useful in clarification of sugar-juice, a stationary vessel, a heating chamber, surrounding said vessel, means for supplying sugar-juice into the vessel while the latter is completely filled with said juice, a rotatable device within the vessel for subjecting said juice to centrifugal action, means for separating said juice from its precipitates, according to their specific gravities, into two cylindric layers, the clear juice forming the medium layer close to the axis of the rotatable device, the scum forming a peripheric layer distant from said axis, and means for leading off separated scum and means for separately leading off the clear juice while in centrifugal action.

6. In an apparatus useful in clarification of sugar-juice, a stationary vessel, means for supplying sugar-juice thereinto, and means for subjecting said juice to centrifugal action, the last named means comprising a device rotatable about an axis disposed eccentrically of the interior of the vessel, means for separating said juice from its precipitates, according to their specific gravities into two eccentric cylindric layers, the clear juice forming the medium layer, close to the axis of said rotatable device, the scum forming the peripheric layer removed from said axis, and means for leading off separated scum and means for separately leading off the clear juice.

7. In an apparatus useful in clarification of sugar-juice, a vessel, and means for subjecting juice within said vessel to centrifugal action, said means comprising a rotatable hollow shaft, provided with openings leading to the hollow interior thereof, means for discharging clear liquid from the apparatus, and succession of blades some narrower than others and mounted for rotation together, the broader blades in contact with the shaft.

8. In an apparatus useful in clarification of sugar-juice, a stationary vessel, means for completely filling with juice, a supplementary chamber for partly filling with juice above said vessel and a passage connecting the vessel and chamber, a gage glass, means for controlling the indicated level in said gage glass, means for controlling the indicated level in said chamber and a cock means for permitting gases to escape from said vessel and chambers, and means in the vessel, for subjecting the contents thereof to centrifugal action.

In testimony whereof I have signed my name to this specification in the presence of two subscribing witnesses.

J. J. HOMANS.

Witnesses:
ALBERT STETSON,
W. H. BERRIGAN.